Patented Oct. 22, 1935

2,018,135

UNITED STATES PATENT OFFICE 2,018,135

PROCESS FOR THE PRODUCTION OF HIGH PERCENTAGE ALKALI CYANIDES FREE FROM SULPHIDES AND CHLORIDES

Hermann Theodor Joseph König, Dordrecht, Netherlands, assignor to N. V. Stikstofbindingsindustrie "Nederland", Dordrecht, Netherlands, a Dutch body corporate No Drawing. Application August 10, 1932, Serial No. 628,269. In the Netherlands February 9, 1931

16 Claims. (Cl. 23—79)

It is known to convert alkaline earth metal cyanamides or substances containing cyanamide groups—such as for instance calcium cyanamide or barium cyanamide into alkali cyanides by heating a mixture of the said substances and alkali carbonates or alkali hydroxides and the like in the presence of carbon at an elevated temperature or by fusing them together: see German patents Nos. 116,087 and 116,088 and the "Zeitschrift für angewandte Chemie" 1903, page 533 and following.

When starting from calcium cyanamide and sodium carbonate the reaction may be represented by the following equations:

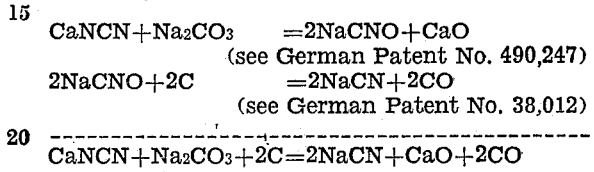

$$CaNCN+Na_2CO_3+2C=2NaCN+CaO+2CO$$

The reaction between alkaline earth metal cyanamides with alkali compounds containing oxygen, particularly soda, is accompanied by hindering secondary reactions, the intermediately formed cyanates decomposing at the required high temperature partially according to the equations:

$$5NaCNO=3NaCN+Na_2CO_3+CO_2+N_2$$
$$4NaCNO=2NaCN+Na_2CO_3+CO+N_2$$

see Drucker and Henglein: "Die Reduktion von Natriumcyanat", Ztschr. für physikalische Chemie, Bodenstein-Festband, 1931.

As a consequence, the above reactions involve considerable nitrogen losses, so that no satisfactory yields of cyanide are obtained.

It is further known to prepare cyanide containing products by reacting technical calcium cyanamide with alkali chlorides or alkali sulfides, or with mixtures of these salts: see U. S. Patent No. 1,359,257 (Landis), U. S. Patent No. 1,277,898 (Freeman), U. S. Patent No. 1,112,893 (Clancy).

The products obtained according to these methods are more or less contaminated with alkali chlorides or alkali sulphides, so that it is impossible to obtain from them a high percentage alkali cyanide free from sulphides and chlorides; see e. g. the U. S. Patent No. 1,734,562, (Cooper). In extracting the crude products obtained according to the above process e. g. with liquid ammonia in order to obtain high percentage alkali cyanides, a sodium cyanide more or less contaminated with sodium chloride or sodium sulfide is always obtained, as NaCl and $Na_2S$, as well as NaCN, are soluble in liquid ammonia.

It has been found now that high percentage alkali cyanides may be obtained with a surprising high yield if alkaline earth metal cyanamides or substances which contain them—such as calcium cyanamide—are caused to react at temperatures above 500° C. with a carbonaceous material or with a material yielding carbon,— e. g. anthracite coal—and an alkali sulphide in the presence of an alkaline earth metal compound, such as calcium carbonate, which is able to react with the latter, and the reaction product thus obtained is subsequently extracted with liquid ammonia or with other non-aqueous, generally organic, solvents such as alcohol or mixtures thereof, for instance according to the French Patent No. 722,795, so that after distilling off the solvent, high percentage alkali cyanides free from alkali sulfide and chlorine with a purity of 96–98% are obtained.

Care has to be taken that the alkaline earth metal compounds which are caused to react with the alkali sulphides are present in excess over the sulfides, which solely warrants the production of sulfide free products.

The above measures enable—contrary to the process of the U. S. Patent 1,112,893 of Clancy— the production of first rate alkali cyanides which completely match the products obtained according to the well-known Castner process from metallic sodium, ammonia and charcoal, so that, by its use of very cheap crude material, the above new process is an important technical improvement with respect to the production of high percentage alkali cyanides.

In heating a mixture of calcium cyanamide, sodium sulphide and anthracite coal in the presence of calcium carbonate to about 700° C. in an atmosphere of nitrogen, next to the main reaction:

$$Na_2S + C + CaNCN = 2NaCN + CaS$$

the secondary reaction:

$$Na_2S + CaCO_3 = Na_2CO_3 + CaS$$

occurs.

The calcium carbonate present in excess over the sodium sulphide which has not been transformed into cyanide, causes a complete removal of alkali sulphide which otherwise has to be extracted.

Instead of calcium carbonate, the reaction mixture may contain other alkaline earth metal compounds—such as calcium carbide—which reacts with alkali sulphides, particularly if technical sulphides which contain alkali sulphates or sulphites are used. In this case the carbide added causes on the one hand the removal by reduction of the eventually present oxygen containing alkali compounds; on the other hand, it yields the quantity of lime required for the removal of the sulphur, so that here also cyanide containing crude products are obtained, which may be transformed in the above described manner into high percentage alkali cyanides. For the reason given above it is also possible to cause to react incompletely azotated alkaline earth metal carbides. The alkaline earth metal carbides may again be substituted by an excess of alkaline earth metal cyanamides, but then loss of nitrogen has to be taken into the bargain.

For the above reactions alkaline earth metal cyanamides containing calcium carbonate are especially suitable. Such a material is the new, so-called "white" calcium cyanamide (white lime-nitrogen) (see H. Frank: "Der Kalkstickstoff in Wissenschaft, Technik und Wirtschaft", 1931, page 169 and the German Patent No. 467,479).

The white calcium cyanamide contains besides calcium oxide important quantities of calcium carbonate, which, after the transformation of the cyanamide, reacts according to the above given equation with the formation of sodium carbonate and calcium sulphide, which results in the production of a cyanide containing crude product, especially suitable for the extraction.

In case the alkaline earth metal cyanamide to be converted into alkali cyanide does not contain calcium carbonate, such as the black calcium cyanamide prepared via calcium carbide, the following measures have to be observed in order to warrant the presence of the necessary quantity of calcium carbonate.

First it is possible to cause the presence of the necessary calcium carbonate by admixing a certain quantity of this substance with the black calcium cyanamide. As the black calcium cyanamide contains sufficient quantities of calcium oxide, which does not react with alkali sulphides, the effect can also be obtained by a treatment with carbon dioxide gas, at temperatures up to 500° C., by which treatment the black cyanamide is transformed into a carbonate containing product, which after having been mixed with sodium sulphide and carbon, may be transformed in the described manner.

Furthermore it is possible to expose the black calcium cyanamide to a treatment with carbon monoxide and ammonia at higher temperatures such as e. g. 650° C., instead of treating it with carbon dioxide. This treatment causes the transformation of the calcium oxide present into calcium cyanamide and calcium carbonate, so that a product equivalent to the white calcium cyanamide is obtained. (See German Patent No. 467,479.)

This treatment with a gaseous mixture of carbon monoxide and ammonia may also be executed during or after the transformation of calcium cyanamide with alkali sulphide and carbon. Accordingly, in passing during or after the reaction a gaseous mixture of carbon monoxide and ammonia, e. g. in the proportion 10:1, at a temperature of 650° C. over the reaction mass, a cyanide is obtained which, after the extraction with liquid ammonia, contains no sodium sulphide and has a purity of 96–98% of NaCN.

Instead of a mixture of carbon monoxide and ammonia, carbon monoxide alone may be used during or after the reaction. In this case the carbon monoxide is decomposed according to the equation:

$$2CO = C + CO_2$$

The carbon dioxide so formed reacts with the calcium oxide present immediately with the formation of calcium carbonate, which reacts in the above mentioned manner with the alkali sulphide which has not yet been transformed, with the formation of soda and calcium sulphide, which are not dissolved when extracting with liquid ammonia.

It is needless to say that for the above mentioned reactions carbon monoxide containing gases, such as producer gas and water gas may also be used. Similarly, carbon monoxide and hydrocarbons containing gas mixtures, such as coal gas may be used. Carbon monoxide and carbon dioxide containing gas mixtures equally serve to produce cyanide containing crude products which are excellently suitable for the production, by means of extraction, of first rate alkali cyanides.

Especially if crude alkali sulphides, containing alkali sulphate are used, the treatment of the mixture of calcium cyanamide, alkali sulphide and carbon with carbon monoxide or gases containing the latter is advantageous.

When using carbon monoxide or gases containing carbon monoxide, it is possible and sometimes advantageous to effect the reaction without a special admixture of a carbon carrier, as the decomposition of the carbon monoxide yields carbon. Moreover, the alkali cyanamide intermediately formed during the reaction (according to the equation $Na_2S + CaN.CN = Na_2N.CN + CaS$) reacts with carbon monoxide with the formation of cyanide and cyanate according to the equation:

$$Na_2NCN + CO = NaCN + NaCNO$$

The alkali cyanate so formed is further reduced to alkali cyanide by an excess of carbon monoxide according to the equation:

$$NaCNO + CO = NaCN + CO_2.$$

(see G. N. Lewis and Th. B. Brighton: The oxidizing power of cyanates and the free energy of formation of cyanides, Journal of the American Chem. Society 40,198, page 482, and Drucker und Henglein: "Die Reduktion von Natriumcyanat", Zeitschrift für Physikalische Chemie, Bodenstein-Festband 1931.)

In treating the reaction mixtures with the gases or gas mixtures in question special care has to be taken that the latter are used in perfectly dry condition in order to prevent a decomposition of the cyanides, caused by the action of water vapour.

The above reaction with carbon monoxide or carbon monoxide containing gases may not only be applied to the black alkaline earth metal cyanamides obtained via alkaline earth metal carbides, but evidently also to the "white" alkaline earth metal cyanamides (produced by the action of ammonia and carbon monoxide on alkaline earth metal oxide) or to otherwise obtained cyanamides.

It is also possible to combine the reactions by which alkaline earth metal cyanamide is formed with the present reaction and so substitute in the present reaction the alkaline earth metal cyanamide by substances which under the conditions of the reaction are able to yield alkaline earth metal cyanamide, such as CaO,CO and NH₃, which react at about 650° C. according to the equation:

$$2CaO + 2CO + 2NH_3 = CaCN_2 + CaCO_3 + 2H_2 + H_2O$$

It appears from the above explanation that the production of high percentage alkali cyanides by transforming alkaline earth metal cyanamides with carbon and alkali sulphide and subsequent extraction is only warranted, if care is taken to provide an excess of alkaline earth metal compounds capable of reacting with alkali sulphides, which excess, as has been stated above, may be produced by different measures. As it appears from his own communications (see U. S. Patent No. 1,112,893, page 3, line 36) Clancy has neither recognized, nor described this effect.

*Example 1*

A mixture of 100 parts by weight of black calcium cyanamide free from calcium carbonate—but containing about 60% of CaNCN, about 20% of CaO, about 10% of carbon and 10% of other impurities—70 parts by weight of sodium sulphide and 16 parts by weight of anthracite coal is heated to 700° C. After the transformation, the reaction mass is treated at the same temperature during some time with a gas mixture of carbon monoxide and hydrogen, containing 90% by volume of CO and 5% by volume of H₂. By extracting the cyanide containing crude product so obtained with liquid ammonia, a high percentage sodium cyanide, free from alkali sulphide, with a purity of 96-98% of NaCN, is obtained.

*Example 2*

50 kg. of white calcium cyanamide, containing about 65% of CaNCN and about 15% of CaCO₃ are mixed with 35 kg. of sodium sulphide and 7.5 kg. of anthracite coal. The mixture thus obtained is subsequently briquetted and heated to 900° C. in a nitrogen atmosphere. This causes the desired transformation. After the reaction 87.5 kg. of a crude product are obtained, which contains about 40% of sodium cyanide besides calcium sulphide and sodium carbonate. After extracting this product with methyl alcohol or with ethyl alcohol of 96%, and evaporating the solvent, a high percentage sodium cyanide, free from sulphide with about 96–98% of NaCN is obtained.

This application is a continuation-in-part of my application Serial No. 591,463, filed February 6, 1932.

What I claim is:

1. A process for the production of high percentage alkali metal cyanide free from sulphide and chloride, comprising heating an alkaline earth metal cyanamide in the absence of chlorides at a reacting temperature above 500° C. with an alkali metal sulphide, a carbon yielding material and an excess of an alkaline earth metal compound capable of reacting at said temperature with the alkali metal sulphide to the formation of an alkaline earth metal sulphide, extracting the reaction mass so obtained with a solvent for the formed alkali metal cyanide, in which the formed alkaline earth metal sulphide is insoluble and recovering the alkali metal cyanide from the extract.

2. A process according to claim 1, in which the necessary excess of alkaline earth metal compound capable of reacting with the alkali metal sulphide is provided by employing less alkali metal sulphide than is chemically equivalent to the amount of cyanamide supplied to the reaction mixture.

3. A process according to claim 1, in which the alkaline earth metal cyanamide is supplied to the reaction mixture by supplying thereto and reacting therein, calcium oxide, carbon monoxide and ammonia.

4. A process according to claim 1, in which the carbon yielding material is a solid carbonaceous material.

5. A process according to claim 1, in which the carbon yielding material is carbon monoxide.

6. A process for the production of high percentage alkali metal cyanide free from sulphide and chloride, comprising heating an alkaline earth metal cyanamide in the absence of chlorides at a reacting temperature above 500° C. with an alkali metal sulphide, a carbonaceous material and an excess of an alkaline earth metal compound capable of reacting at said temperature with the alkali metal sulphide to the formation of an alkaline earth metal sulphide, treating the reaction mixture with a carbon monoxide containing gas, extracting the reaction mass with a solvent for the formed alkali metal cyanide in which the formed alkaline earth metal sulphide is insoluble and recovering the alkali metal cyanide from the extract.

7. A process according to claim 6, in which the carbon monoxide containing gas contains also carbon dioxide.

8. A process according to claim 6, in which the carbon monoxide containing gas contains also ammonia.

9. A process according to claim 6, in which the carbon monoxide containing gas contains also a hydrocarbon.

10. A process for the production of high percentage alkali metal cyanide, free from sulphide and chloride, comprising heating calcium cyanamide in the absence of chlorides at a reacting temperature above 500° C. with alkali metal sulphide and anthracite coal in the presence of an excess of a calcium compound capable of reacting with the alkali metal sulphide at said reaction temperature, extracting the so obtained reaction mass with liquid ammonia and separating the solvent from the alkali metal cyanide.

11. A process according to claim 10, in which the heating is carried out in the presence of carbon monoxide containing gas.

12. A process for the production of high percentage alkali metal cyanide free from sulphide and chloride, comprising heating lime nitrogen at a temperature above 500° C. with an alkali metal sulphide, a carbonaceous material and an excess of a calcium compound capable of reacting with alkali sulfide, extracting the reaction product with a non-aqueous solvent for the formed alkali metal cyanide in which the formed calcium sulphide is insoluble, said non-aqueous solvent containing an organic solvent, and recovering the alkali metal cyanide from the extract.

13. A process according to claim 12, in which the solvent is a mixture of alcohol and ammonia.

14. A process for the production of high percentage alkali metal cyanide free from sulphide and chloride, comprising heating "white" lime nitrogen containing a substantial amount of calcium carbonate at a temperature above 500° C. with an amount of an alkali metal sulphide substantially equivalent to the calcium cyanamide present and a carbon yielding material, extracting the reaction product with a non-aqueous solvent for the formed alkali metal cyanide in which calcium sulphide is insoluble and separating the alkali metal cyanide from the extract.

15. A process according to claim 14, in which the non-aqueous solvent is liquid ammonia.

16. A process according to claim 14, in which the non-aqueous solvent is an alcohol.

HERMANN THEODOR JOSEPH KÖNIG.